(12) United States Patent
Liang et al.

(10) Patent No.: US 11,002,602 B2
(45) Date of Patent: May 11, 2021

(54) SPECTROSCOPE

(71) Applicant: BOE TECHNOLOGY GROUP CO., LTD., Beijing (CN)

(72) Inventors: Pengxia Liang, Beijing (CN); Fangzhou Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/825,355

(22) Filed: Mar. 20, 2020

(65) Prior Publication Data

US 2021/0072079 A1 Mar. 11, 2021

(30) Foreign Application Priority Data

Sep. 9, 2019 (CN) .......................... 201910849177.1

(51) Int. Cl.
*G01J 3/12* (2006.01)
*G01J 3/02* (2006.01)
*G02F 1/13357* (2006.01)
*G02F 1/1335* (2006.01)

(52) U.S. Cl.
CPC .............. *G01J 3/12* (2013.01); *G01J 3/0205* (2013.01); *G02F 1/1336* (2013.01); *G02F 1/133601* (2021.01)

(58) Field of Classification Search
None
See application file for complete search history.

(56) References Cited

U.S. PATENT DOCUMENTS

| 8,552,374 B2 | 10/2013 | Hikmet et al. |
| 2003/0067602 A1* | 4/2003 | Patel .................... G01M 11/331 356/369 |
| 2009/0273840 A1 | 11/2009 | McLaughlin |

(Continued)

FOREIGN PATENT DOCUMENTS

| CN | 102171544 A | 8/2011 |
| CN | 102680100 A | 9/2012 |

(Continued)

OTHER PUBLICATIONS

First Chinese Office Action dated Feb. 20, 2021, received for corresponding Chinese Application No. 201910849177.1, 9 pages.

*Primary Examiner* — Shawn Decenzo
(74) *Attorney, Agent, or Firm* — Kinney & Lange, P.A.

(57) ABSTRACT

A spectroscope includes a first substrate and a second substrate opposite to each other; a light introducing assembly on a side of the first substrate facing away from the second substrate; a temperature adjusting assembly between the first substrate and the second substrate; a liquid crystal dimming assembly between the first substrate and the second substrate, wherein the temperature adjusting assembly is configured to adjust a temperature of the liquid crystal dimming assembly, so as to adjust spectrum of light passing through the liquid crystal dimming assembly; a spectroscopic grating on the first substrate; a reflector on the second substrate and configured to reflect incident light introduced by the light introducing assembly to the spectroscopic grating; and a plurality of sensors configured to receive the incident light after being subjected a light splitting by the spectroscopic grating. A wavelength of the incident light received by each sensor is different.

19 Claims, 3 Drawing Sheets

(56) References Cited

U.S. PATENT DOCUMENTS

| | | | |
|---|---|---|---|
| 2011/0174976 A1* | 7/2011 | Meijer | G01J 3/32 |
| | | | 250/331 |
| 2011/0174977 A1 | 7/2011 | Hikmet et al. | |
| 2013/0027701 A1* | 1/2013 | Priore | G01N 21/276 |
| | | | 356/326 |
| 2013/0235459 A1 | 9/2013 | Shiozaki et al. | |
| 2014/0233082 A1* | 8/2014 | Smeets | G01J 3/00 |
| | | | 359/238 |
| 2014/0313342 A1* | 10/2014 | Gan | H04N 5/332 |
| | | | 348/162 |
| 2016/0033328 A1* | 2/2016 | Walters | G01J 3/0208 |
| | | | 356/327 |
| 2016/0123811 A1* | 5/2016 | Hegyi | G01J 3/4537 |
| | | | 348/33 |
| 2019/0162999 A1* | 5/2019 | Hegyi | G02F 1/13306 |
| 2021/0014434 A1* | 1/2021 | Choi | G01J 3/108 |

FOREIGN PATENT DOCUMENTS

| | | |
|---|---|---|
| CN | 103201667 A | 7/2013 |
| JP | 2003214951 A | 7/2003 |

\* cited by examiner

SPECTROSCOPE

CROSS-REFERENCE TO RELATED APPLICATION

The present application claims the benefit of Chinese Patent Application No. 201910849177.1 filed on Sep. 9, 2019 in the State Intellectual Property Office of China, the whole disclosure of which is incorporated herein by reference.

TECHNICAL FIELD

Embodiments of the present disclosure relate to a technical field of measuring instruments, and in particular, to a spectroscope.

BACKGROUND

A spectroscope is a scientific instrument that decomposes complex light into spectral lines. It includes a prism or a diffraction grating. The spectroscope can measure the light reflected from the surface of an object. The optical information is captured by a spectroscope, and is developed with photographic film, or displayed and analyzed by a computerized automatic display numerical instrument, so as to determine what kind of element is contained in the article. In related technologies, portable spectroscopes generally use the traditional optical lens mode. Due to the limitation of the focal length of the optical lens, the lens needs to be placed at a certain height, which results in the spectroscope being bulky and heavy, making it difficult to achieve thinness and high integration.

SUMMARY

According to an aspect of the present disclosure, there is provided a spectroscope comprising a first substrate and a second substrate opposite to each other; a light introducing assembly on a side of the first substrate facing away from the second substrate; a temperature adjusting assembly located between the first substrate and the second substrate; a liquid crystal dimming assembly located between the first substrate and the second substrate, wherein the temperature adjusting assembly is configured to adjust a temperature of the liquid crystal dimming assembly, so as to adjust spectrum of light passing through the liquid crystal dimming assembly; a spectroscopic grating located on the first substrate; a reflector located on the second substrate and configured to reflect incident light introduced by the light introducing assembly to the spectroscopic grating; a plurality of sensors configured to receive the incident light after being subjected a light splitting by the spectroscopic grating, wherein a wavelength of the incident light received by each sensor is different.

In some embodiments of the present disclosure, the temperature adjusting assembly comprises a first electrode and a second electrode, and a voltage between the first electrode and the second electrode is configured to adjust the temperature of the liquid crystal dimming assembly.

In some embodiments of the present disclosure, the first electrode is located on the first substrate, the second electrode is located on the second substrate, and the liquid crystal dimming assembly is located between the first electrode and the second electrode.

In some embodiments of the present disclosure, the first electrode and the second electrode are both located on the first substrate, or the first electrode and the second electrode are both located on the second substrate.

In some embodiments of the present disclosure, the temperature adjusting assembly comprises a heating resistor, and the heating resistance is configured to adjust the temperature of the liquid crystal dimming assembly.

In some embodiments of the present disclosure, a region between the first substrate and the second substrate comprises: a first region that receives the light introducing assembly, the liquid crystal dimming assembly, the first electrode, the second electrode, and the reflector; a second region that receives the plurality of sensors, wherein the spectroscopic grating is at least partially located in the second region.

In some embodiments of the present disclosure, the spectroscope further comprises a first light-shielding layer located in the first region and between the first substrate and the first electrode, wherein the first light-shielding layer has a first opening, and the light introducing assembly introduces the incident light through the first opening.

In some embodiments of the present disclosure, the spectroscope further comprises: a second light-shielding layer located in the first region and between the second substrate and the second electrode, wherein the second light-shielding layer has a second opening, and the reflector is located in the second opening.

In some embodiments of the present disclosure, the spectroscope further comprises: a light-transmissive filling medium filled in the second region.

In some embodiments of the present disclosure, the spectroscopic grating comprises a reflective planar diffraction grating.

In some embodiments of the present disclosure, the liquid crystal dimming assembly comprises a liquid crystal cell, a liquid crystal microcapsule, or a liquid crystal film.

In some embodiments of the present disclosure, the liquid crystal contained in the liquid crystal dimming assembly is composed of a cholesteric liquid crystal.

In some embodiments of the present disclosure, the spectroscope further comprises: a voltage adjustment assembly connected to the first electrode and the second electrode.

In some embodiments of the present disclosure, the light introducing assembly comprises an optical fiber or a lens.

In some embodiments of the present disclosure, the number and positions of the plurality of sensors depend on an incident angle of the incident light, a position and a spectral capability of the reflector, and/or a position of the spectroscopic grating.

In some embodiments of the present disclosure, the spectroscopic grating is located on a side of the first substrate facing away from the second substrate, and the plurality of sensors are located on one of a surface of the first substrate facing the second substrate, a surface of the second substrate facing the first substrate and a surface of the second substrate away from the first substrate.

In some embodiments of the present disclosure, the spectroscopic grating is located on a surface of the first substrate facing the second substrate, and the plurality of sensors are located on a surface of the second substrate facing the first substrate or a surface of the second substrate away from the first substrate.

In some embodiments of the present disclosure, the spectroscopic grating is embedded in the first substrate, and the plurality of sensors are located on one of a surface of the first substrate facing the second substrate, a surface of the second substrate facing the first substrate and a surface of the second substrate away from the first substrate.

In some embodiments of the present disclosure, the reflector is made of a metal material.

BRIEF DESCRIPTION OF THE DRAWINGS

The above and/or additional aspects and advantages of the present disclosure will become apparent and easily understood from the following description of the embodiments in conjunction with the accompanying drawings, in which.

DETAILED DESCRIPTION OF EMBODIMENTS

Figure 1:
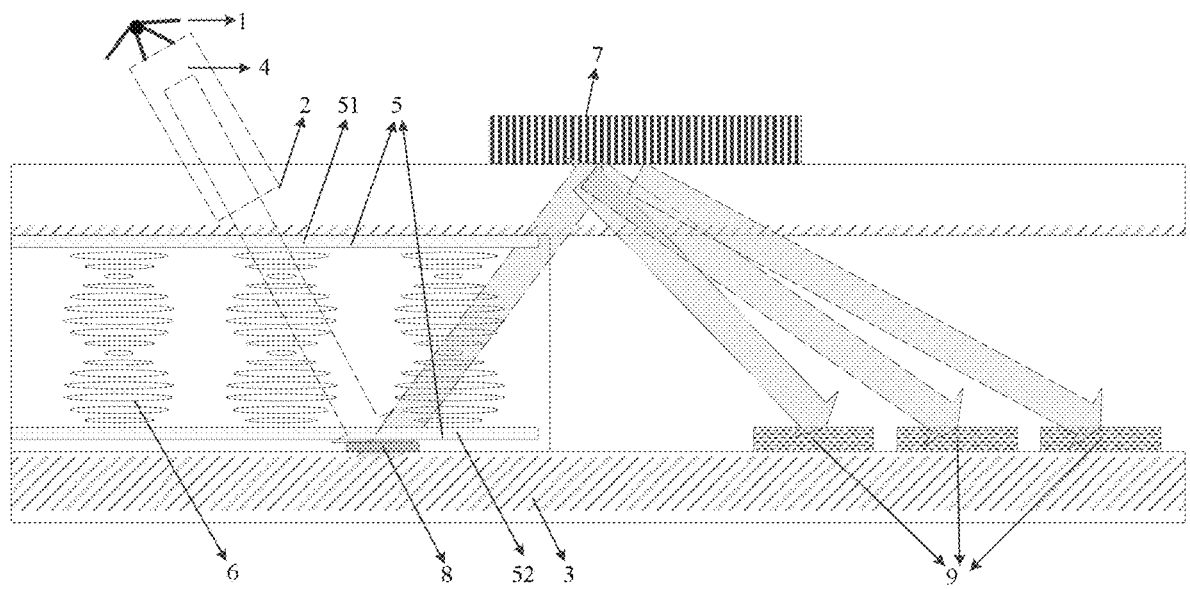
FIG. 1 is a schematic structural diagram of a spectroscope provided by an embodiment of the present disclosure.

Hereinafter, embodiments of the present disclosure will be described in detail. Examples of the embodiments are shown in the drawings, wherein the same or similar reference numerals represent the same or similar elements throughout. The embodiments described below with reference to the drawings are exemplary, and are intended to explain the present disclosure, and should not be construed as limiting the present disclosure.

The embodiments of the present disclosure are proposed over the portable spectroscope using a conventional optical lens mode in the related art. Due to the limitation of the focal length of the optical lens, the lens needs to be placed at a certain height, which causes the spectroscope to be bulky and heavy, making it difficult to achieve thinness and high integration.

A spectroscope provided by an embodiment of the present disclosure includes a first substrate and a second substrate, a light introducing assembly located on the first substrate, a temperature adjusting assembly located between the first substrate and the second substrate, the liquid crystal dimming assembly between the first substrate and the second substrate; the temperature adjusting assembly is used to adjust the temperature of the liquid crystal dimming assembly to adjust the spectrum transmitted through the liquid crystal dimming assembly. A light spectroscopic grating is located on the first substrate and a reflector is located on the second substrate. The reflector is used to reflect the incident light introduced by the light introducing assembly to the spectroscopic grating, and a plurality of sensors are used to receive the incident light after being split by the spectroscopic grating. The wavelength of the incident light received by each sensor is different. Therefore, the entire spectroscope is based on the substrate, and no lens or reflection unit is required, which not only reduces the production cost, but also reduces the volume and weight of the spectroscope, thereby improves the lightness, thinning and integration of the spectroscope.

The spectroscope provided by the present disclosure will be described in detail below with reference to the drawings.

FIG. 1 is a schematic structural diagram of a spectroscope provided by an embodiment of the present disclosure.

As shown in FIG. 1, the spectroscope includes:

a first substrate (2) and a second substrate (3);

a light introducing assembly (4) located on a side of the first substrate (2) facing away from the second substrate;

a temperature adjusting assembly (5) between the first substrate (2) and the second substrate (3);

a liquid crystal dimming assembly (6) located between the first substrate (2) and the second substrate (3), wherein the temperature adjusting assembly (5) is used to adjust the temperature of the liquid crystal dimming assembly (6) to adjust the spectrum of light transmitted through the liquid crystal dimming assembly (6);

a spectroscopic grating (7) on the first substrate (2);

a reflector (8) located on the second substrate (3) and configured to reflect incident light (1) introduced by the light introducing assembly (4) to the spectroscopic grating (7);

a plurality of sensors (9) used to receive incident light after being split by the spectroscopic grating (7), the wavelength of the incident light received by each sensor (9) is different.

The incident light (1) may be a broad-spectrum light source, for example, it may be white light, infrared band or the like. In actual use, the type of incident light (1) that the spectroscope of the embodiment of the present disclosure can identify and measure can be designed according to specific product requirements, which is not limited in the embodiments of the present disclosure.

The materials of the first substrate (2) and the second substrate (3) may be light-transmissive materials. Optionally, in the embodiment of the present disclosure, the material of the first substrate (2) and the second substrate (3) may be glass, and the first substrate (2) and the second substrate (3) may be placed in parallel. The distance between them can be on an order of millimeters, such as 1 millimeter, so that the overall volume and thickness of the spectroscope are greatly reduced.

It should be noted that, if the spectroscope according to the embodiment of the present disclosure is used to measure ingredients of an object, and the like, the incident light (1) may be a sample of light emitted by the object to be measured.

In the embodiment of the present disclosure, the light introducing assembly (4) can couple the incident light (1) to the first substrate (2) and provide a certain initial angle so that the incident light (1) can sequentially pass through the first substrate (2), the temperature adjusting assembly (5) and the liquid crystal dimming assembly (6) and then reach the reflector (8) on the second substrate (3) thereby the reflector (8) reflecting incident light incident thereon to the spectroscopic grating (7), so that the spectroscopic grating (7) splits the incident light (1).

It can be understood that the incident light (1), the light introducing assembly (4), the reflector (8), and the spectroscopic grating (7) form a collimated optical path to complete the screening and splitting of the light angle, thereby eliminating the need for lens assemblies. The collimation of the incident light (1) can achieve between the first substrate (2) and the second substrate (3) which are spaced in an extremely close distance, reducing the volume of the spectroscope.

It should be noted that the reflector (8) may be composed of a material having a good light reflection effect, for example, the material of the reflector (8) may be a metal.

Optionally, the light introducing assembly (4) may be an optical fiber or a lens, so as to converge the incident light (1) and improve the propagation quality of the incident light (1) in the spectroscope.

In the embodiment of the present disclosure, the liquid crystal dimming assembly (6) can be used to screen the wavelength of the incident light (1) to achieve different detection requirements. Specifically, since the liquid crystal dimming assembly (6) is sensitive to temperature and a transmittance to light of different wavelengths of the liquid crystal dimming assembly (6) is different when being at different temperatures, the wavelength of the light transmitted through the liquid crystal dimming assembly (6) may be adjusted by adjusting the temperature of the liquid crystal dimming assembly (6) through the temperature adjusting assembly (5), thereby realizing the screening of the wavelength of the incident light (1).

Optionally, the liquid crystal dimming assembly (6) can be heated by an electric field or an electrode to change the temperature of the liquid crystal dimming assembly (6). That is, in a possible implementation form of the embodiment of the present disclosure, the temperature adjusting assembly (5) may include:

the first electrode (51) and the second electrode (52), and the voltage between the first electrode (51) and the second electrode (52) is used to adjust the temperature of the liquid crystal dimming assembly (6).

Optionally, when the first electrode (51) and the second electrode (52) are used to form the temperature adjusting assembly (5), the first electrode (51) may be located on the first substrate (2), and the second electrode (52) is located on the second substrate (3), and the liquid crystal dimming assembly is located between the first electrode (51) and the second electrode (52), as shown in FIG. 1.

Optionally, when the first electrode (51) and the second electrode (52) are used to form the temperature adjusting assembly (5), the electrodes can also be arranged in an IPS mode (In-Plane Switching), that is, the first electrode (51) and a second electrode (52) are located on the same substrate. That is, in a possible implementation form of the embodiment of the present disclosure, the first electrode (51) and the second electrode (52) are both located on the first substrate (2), or the first electrode (51) and the second electrode (52) are both located on the second substrate (3).

Optionally, the liquid crystal dimming assembly (6) can also be heated by a heating resistor. That is, in a possible implementation form of the embodiment of the present disclosure, the temperature adjusting assembly (5) may include:

a heating resistor which is used to adjust the temperature of the liquid crystal dimming assembly (6).

It should be noted that when the heating resistor is used to form the temperature adjusting assembly (5), the heating resistor may be located on the first substrate (2) or the second substrate (3); correspondingly, the heating resistor is located on the first substrate (2)), the liquid crystal dimming assembly (6) is located between the heating resistor and the second substrate (3); when the heating resistor is located on the second substrate (3), the liquid crystal dimming assembly (6) is located between the heating resistor and the first substrate (2).

It should be noted that liquid crystal is a substance in a state between liquid and solid materials. It has both the fluidity and surface tension of liquids, and the optical anisotropy and birefringence characteristics of solid crystals. Thermochromic liquid crystals change colors when their temperature changes. At present, they have been widely used in aerospace, electronic engineering, medical examination and various crafts.

Figure 2:
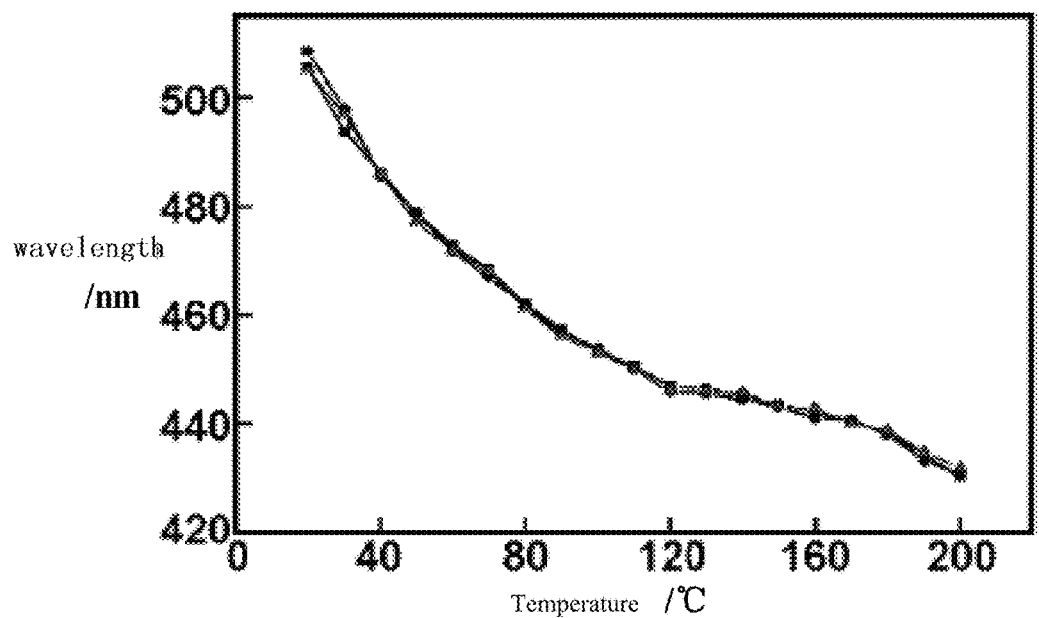
FIG. 2 is a schematic diagram showing a relationship between a reflection wavelength and a temperature of a cholesteric liquid crystal.

Optionally, the liquid crystal of the liquid crystal dimming assembly (6) of the embodiment of the present disclosure may be composed of a cholesteric liquid crystal. Due to the special reflection effect of the cholesteric liquid crystal, the reflected color can be controlled by controlling its pitch. The reflection wavelength control of reflection-type cholesteric liquid crystal can be realized. Specific methods include heating or cooling methods, photochemical methods, and electric field control methods. As shown in FIG. 2, it is a schematic diagram of the relationship between the reflection wavelength and the temperature of a cholesteric liquid crystal. In the embodiment of the present disclosure, the temperature of the liquid crystal dimming assembly (6) can be adjusted by the electric field control method, that is, the liquid crystal dimming assembly (6) is heated by the voltage between the first electrode (51) and the second electrode (52), so as to regulate the transmission spectrum of the liquid crystal dimming assembly (6).

In the embodiment of the present disclosure, the liquid crystal dimming assembly (6) may be made into a liquid crystal cell, a liquid crystal microcapsule, or a liquid crystal film. In actual use, according to specific product requirements, a suitable production mode of the liquid crystal dimming assembly (6) can be selected.

It should be noted that the resolution of a spectroscope refers to its ability to distinguish between two spectral lines. It depends not only on the dispersion rate of the instrument, but also on the intensity distribution profile of the spectral lines and their relative positions. Optionally, in the embodiment of the present disclosure, the spectroscopic grating (7) may be a reflective planar diffraction grating, which mainly determines the resolution of the entire optical system. The dispersion equation of a reflective planar diffraction grating is:

$$d(\sin \varphi + \sin \varphi') = k\lambda \quad (1)$$

where, d is the grating constant; $\varphi$ is the angle of incidence; $\varphi'$ is the diffraction angle of the grating; $\lambda$ is the wavelength of light; k is the diffraction order, and k=0, ±1, ±2, . . . . According to the Rayleigh criterion, when two maximum and minimum spectral lines with the same intensity profile overlap, they can be resolved. At this time, the theoretical resolution R of the grating can be expressed as $$R = \lambda/\Delta\lambda = kN \quad (2)$$

where, $\lambda$ is the wavelength of light; $\Delta\lambda$ is the minimum wavelength interval of the resolution; k is the diffraction order; N is the total number of grating lines of the grating, which is equal to the product of the grating constant d and the length of the grating scribed surface. It can be known from formula (2) that the more the total number of grating lines of the grating, the higher the diffraction order, the larger the theoretical resolution, and the smaller the minimum wavelength interval of resolution. However, in order to have sufficient energy for detection, and at the same time to distinguish the spectrum of each wavelength, usually +1 order or −1 order diffraction is used. At this time, the system resolution can be improved by increasing the grating constant and the grating scratched surface, but formula (1) shows that at the same incident angle, the larger the grating constant, the larger the diffraction angle, which will increase the receiving surface of the spectroscope, and the system volume and is not beneficial to the miniaturization of the spectroscope. Therefore, the choice of grating constants is very important in the structural design of mini spectroscopes.

In the embodiment of the present disclosure, after the spectroscopic grating (7) splits the incident light (1), the sensor (9) receives the incident light after being subjected to the splitting, to detect each light beam after being subjected to the splitting, wherein the wavelengths of the incident light received by each sensor (9) are different, that is, each beam after being subjected to the splitting has a different wavelength and is received by different sensors.

It can be understood that the number and position of the plurality of sensors are related to the incident angle of the incident light, the position of the reflector, the position of the spectroscopic grating, and the spectroscopic ability. Specifically, since each sensor is used to receive each beam split by the spectroscopic grating (7), the number of split beams can be determined according to the performance of the spectroscopic grating (7), and the number of the light beams split by the spectroscopic grating (7) may be set as the number of sensors (9); the positions of the plurality of sensors (9) can be determined according to the propagation path of the incident light (1) in the spectroscope, so that each of the plurality of sensors (9) can accurately receive each of the split light beam, and the propagation path of the incident light (1) in the spectroscope is related to the incident angle of the incident light (1), the position of the reflector (8), and the position of the spectroscopic grating (7), so that the positions of plurality of sensors (9) may be determined according to the incidence angle of the incident light (1), the position of the reflector (8), and the position of the spectroscopic grating (7).

In a disclosed embodiment, a plurality of sensors (9) may be located on one of a surface of the first substrate (2) facing the second substrate, which is also referred to as an inner surface, and a surface of the second substrate (3) facing the first substrate, which is also referred to as the inner surface and the surface of the second substrate (3) facing away from the first substrate, which is also referred to as the outer surface. Specifically, when detecting inside the box, the plurality of sensors (9) can be located on the inner surface of the first substrate (2) or on the inner surface of the second substrate (3); when detecting outside the box, the plurality of sensors (9) can be located on the outer surface of the second substrate (3).

A spectroscope provided by an embodiment of the present disclosure includes a first substrate and a second substrate, a light introducing assembly located on the first substrate, a temperature adjusting assembly located between the first substrate and the second substrate, and a liquid crystal dimming assembly between the first substrate and the second substrate. The temperature adjusting assembly is used to adjust the temperature of the liquid crystal dimming assembly to adjust the spectrum transmitted through the liquid crystal dimming assembly. A spectroscopic grating is located on the first substrate. A reflector is located on the second substrate to reflect the incident light introduced by the light introducing assembly to the spectroscopic grating. A plurality of sensors are used to receive the incident light after being subjected to the spectroscopic grating. The wavelength of the incident light received by each sensor is different. Therefore, the entire spectroscope is based on the substrate, and no lens or reflection unit is required, which not only reduces the production cost, but also reduces the volume and weight of the spectroscope, and improves the lightness, thinness and integration of the spectroscope.

In a possible implementation form of the present disclosure, a light-shielding layer may also be provided between the first substrate and the first electrode, and between the second substrate and the second electrode, so as to prevent incident light from passing through the first and second substrate after the incident light is introduced into the first substrate by the light introducing assembly, resulting in attenuation of the incident light, adversely affecting the propagation quality of the incident light and the measurement accuracy of the spectroscope.

The spectroscope provided by the embodiment of the present disclosure is further described below with reference to FIG. 3.

Figure 3:
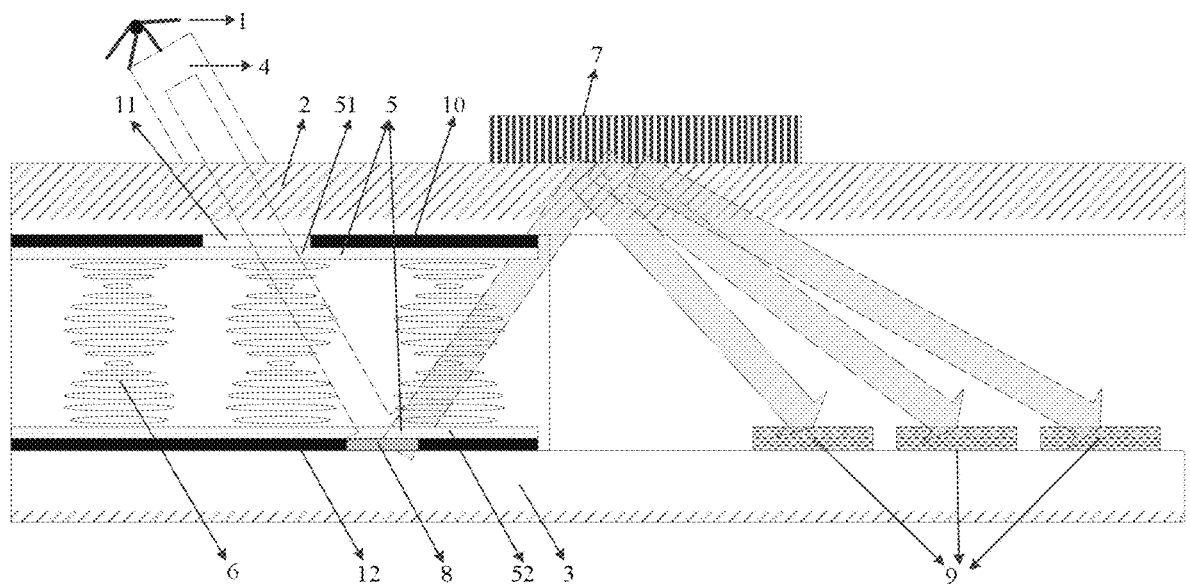
FIG. 3 is a schematic structural diagram of another spectroscope according to an embodiment of the present disclosure.

FIG. 3 is a schematic structural diagram of another spectroscope according to an embodiment of the present disclosure.

As shown in FIG. 3, based on the embodiment shown in FIG. 1, the spectroscope may further include:

a first region that contains the light introducing assembly (4), the liquid crystal dimming assembly (6), the first electrode (51), the second electrode (52), and the reflection (8);

a second region that contains the sensor (9), the spectroscopic grating (7) is at least partially located in said second region;

a first light-shielding layer (10) located in the first region and between the first substrate (2) and the first electrode (51), the first light-shielding layer (10) has a first opening (11), and the light introducing assembly (4) introduces the incident light (1) through the first opening (11);

a second light-shielding layer (12) located in the first region and between the second substrate (3) and the second electrode (52), the second light-shielding layer (12) has a second opening, the reflector (8) is located in the second opening.

In the embodiment of the present disclosure, a region between the first substrate (2) and the second substrate (3) may be divided into a first region and a second region, and the region where the light introducing assembly (4), the liquid crystal dimming assembly (6), the first electrode (51), the second electrode (52) and the reflector (8) are located is the first region, the region where the sensors (9) are located is the second region. A first light-shielding layer (10) is provided in a first region between the first substrate (2) and the first electrode (51), and a second light-shielding is provided in the first region between the second substrate (3) and the second electrode (52). So that the incident light (1) which is introduced by the light introducing assembly (4) into the first substrate (2) through the first opening (11), cannot be reflected again through the first substrate (2), and at the same time cannot be transmitted through the second substrate (3), thereby reducing the attenuation of the incident light (1) in the propagation process, and further improving the propagation quality of the incident light and the measurement accuracy of the spectroscope.

In the embodiment of the present disclosure, the spectroscopic grating (7) may be located at least partially in the second region, so that the spectroscopic grating (7) can receive the incident light (1) reflected by the reflector (8). In practical use, the spectroscopic grating (7) may be directly processed into the first substrate by using processes such as nano-imprinting and exposure, or may be separately fabricated and bonded to the surface of the first substrate, which is not limited in the embodiments of the present disclosure.

Figure 4:
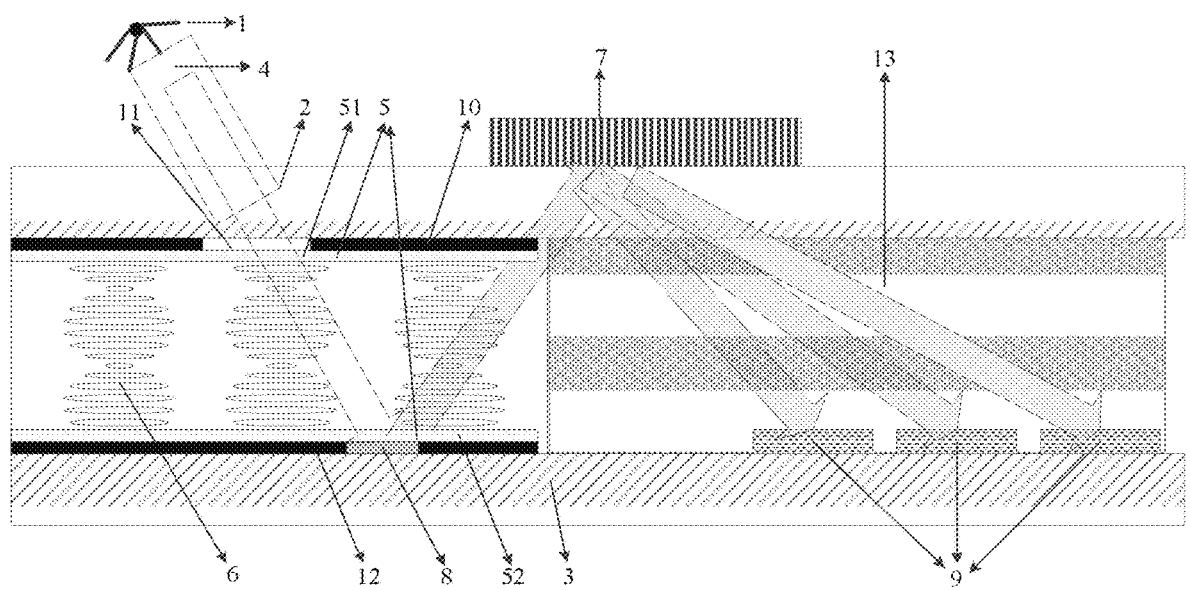
FIG. 4 is a schematic structural diagram of still another spectroscope according to an embodiment of the present disclosure.

Further, in order to ensure the propagation quality of the incident light (1) to the sensor after being split by the spectroscopic grating (7), a light-transmissive filling medium may be filled in the second region. That is, in a possible implementation form of the embodiment of the present disclosure, referring to FIG. 4, based on the embodiment shown in FIG. 3, the above spectroscope may further include:

A light-transmissive filling medium (13) filled in the second region.

As a possible implementation manner, after the spectroscopic grating (7) splits the incident light (1) into the plurality of beams, it also needs to transmit these beam a certain distance to reach the sensor (9). The second region is filled with a light-transmissive filling medium (13) to ensure the propagation quality of each light beam after the splitting, so as to further improve the measurement accuracy of the spectroscope.

Figure 5:
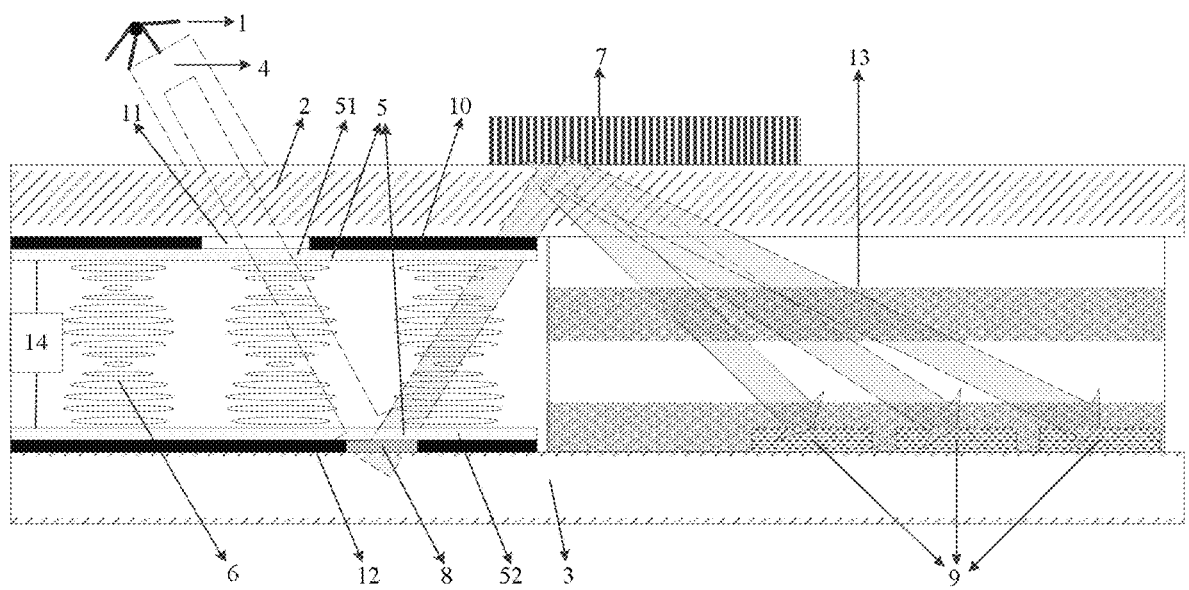
FIG. 5 is a schematic structural diagram of still another spectroscope according to an embodiment of the present disclosure.

Further, when the liquid crystal dimming assembly (6) is heated by the voltage between the first electrode (51) and the second electrode (52) to regulate the transmission spectrum of the liquid crystal dimming assembly (6), it is possible to change the voltage between the first electrode (51) and the second electrode (52) to achieve a purpose of adjusting the temperature of the liquid crystal dimming assembly (6). That is, in a possible implementation form of the embodiment of the present disclosure, referring to FIG. 5, based on the embodiment shown in FIG. 4, the above spectroscope may further include:

a voltage adjustment assembly (14) connected to the first electrode (51) and the second electrode (52).

As a possible implementation manner, a voltage adjustment assembly (14) may be connected between the first electrode (51) and the second electrode (52), so that, according to actual measurement requirements, the voltage between the electrode (51) and the second electrode (52) is adjusted by the light introducing assembly (4), so that, according to actual measurement requirements, the temperature of the liquid crystal dimming assembly (6) can be adjusted, so that the wavelength of the light (1) through the liquid crystal dimming assembly (6) is adjusted, that is the wavelength of the incident light (1) passing through the liquid crystal dimming assembly (6) meets the actual measurement requirements.

A spectroscope provided by an embodiment of the present disclosure includes a first substrate and a second substrate, a light introducing assembly located on the first substrate, a first electrode located on the first substrate, and a second electrode located on the second substrate. A liquid crystal dimming assembly is located between the first electrode and the second electrode, a first light shielding layer is located between the first substrate and the first electrode, and a second light shielding layer is located between the second substrate and the second electrode. The voltage between one electrode and the second electrode is used to adjust the spectrum transmitted through the liquid crystal dimming assembly. The spectroscopic grating is located on the first substrate and the reflector on the second substrate is used to reflect the incident light introduced by the light introducing assembly to the spectroscopic grating. A voltage adjustment assembly is connected to the first electrode and the second electrode and a light-transmissive filling medium is filled in the second region, and a plurality of sensors for receiving the incident light split by the spectroscopic grating. The wavelength of the incident light received by each sensor is different. As a result, the entire spectroscope is based on the substrate, eliminating the need for lenses and reflection units, which not only reduces production costs, reduces the volume and weight of the spectroscope, improves the lightness, thinness and integration of the spectroscope, but also further improves the propagation quality and measurement accuracy of the spectroscope through which the incident light passes.

Those skilled in the art will readily contemplate other embodiments of the present disclosure after considering the specification and practicing the embodiments disclosed herein. This disclosure is intended to cover any variations, uses, or adaptations of this disclosure that conform to the general principles of this disclosure and include the common general knowledge or conventional technical means in the technical field that this disclosure does not invent. It is intended that the specification and examples be considered as exemplary only, with a true scope and spirit of the disclosure being indicated by the following claims.

It should be understood that the present disclosure is not limited to the precise structure that has been described above and illustrated in the accompanying drawings, and various modifications and changes may be made without departing from the scope thereof. The scope of the disclosure is limited only by the following claims.

What is claimed is:

1. A spectroscope, comprising:
    a first substrate and a second substrate opposite to each other;
    a light introducing assembly on a side of the first substrate facing away from the second substrate;
    a temperature adjusting assembly located between the first substrate and the second substrate;
    a liquid crystal dimming assembly located between the first substrate and the second substrate, wherein the temperature adjusting assembly is configured to adjust a temperature of the liquid crystal dimming assembly, so as to adjust a spectrum of light passing through the liquid crystal dimming assembly;
    a spectroscopic grating located on the first substrate;
    a reflector located on the second substrate and configured to reflect incident light introduced by the light introducing assembly to the spectroscopic grating; and
    a plurality of sensors configured to receive the incident light after being subjected to light splitting by the spectroscopic grating, wherein a wavelength of the incident light received by each sensor of the plurality of sensors is different.

2. The spectroscope according to claim 1, wherein the temperature adjusting assembly comprises a first electrode and a second electrode, and a voltage between the first electrode and the second electrode is configured to adjust the temperature of the liquid crystal dimming assembly.

3. The spectroscope according to claim 2, wherein the first electrode is located on the first substrate, the second electrode is located on the second substrate, and the liquid crystal dimming assembly is located between the first electrode and the second electrode.

4. The spectroscope according to claim 2, wherein the first electrode and the second electrode are both located on the first substrate, or the first electrode and the second electrode are both located on the second substrate.

5. The spectroscope according to claim 1, wherein the temperature adjusting assembly comprises a heating resistor, and the heating resistor is configured to adjust the temperature of the liquid crystal dimming assembly.

6. The spectroscope according to claim 3, wherein a region between the first substrate and the second substrate comprises:
    a first region that receives the light introducing assembly, the liquid crystal dimming assembly, the first electrode, the second electrode, and the reflector; and
    a second region that receives the plurality of sensors, wherein the spectroscopic grating is at least partially located in the second region.

7. The spectroscope according to claim 6, further comprising:
    a first light-shielding layer located in the first region and between the first substrate and the first electrode, wherein the first light-shielding layer has a first opening, and the light introducing assembly introduces the incident light through the first opening.

8. The spectroscope according to claim 6, further comprising:
a second light-shielding layer located in the first region and between the second substrate and the second electrode, wherein the second light-shielding layer has a second opening, and the reflector is located in the second opening.

9. The spectroscope according to claim 6, further comprising:
a light-transmissive filling medium filled in the second region.

10. The spectroscope according to claim 1, wherein the spectroscopic grating comprises a reflective planar diffraction grating.

11. The spectroscope according to claim 1, wherein the liquid crystal dimming assembly comprises a liquid crystal cell, a liquid crystal microcapsule, or a liquid crystal film.

12. The spectroscope according to claim 1, wherein liquid crystal contained in the liquid crystal dimming assembly is composed of a cholesteric liquid crystal.

13. The spectroscope according to claim 2, further comprising:
a voltage adjustment assembly connected to the first electrode and the second electrode.

14. The spectroscope according to claim 1, wherein the light introducing assembly comprises an optical fiber or a lens.

15. The spectroscope according to claim 1, wherein a number and positions of the plurality of sensors depend on an incident angle of the incident light, a position and a spectral capability of the reflector, and/or a position of the spectroscopic grating.

16. The spectroscope according to claim 1, wherein the spectroscopic grating is located on a side of the first substrate facing away from the second substrate, and the plurality of sensors are located on one of a surface of the first substrate facing the second substrate, a surface of the second substrate facing the first substrate, or a surface of the second substrate away from the first substrate.

17. The spectroscope according to claim 1, wherein the spectroscopic grating is located on a surface of the first substrate facing the second substrate, and the plurality of sensors are located on a surface of the second substrate facing the first substrate or a surface of the second substrate away from the first substrate.

18. The spectroscope according to claim 1, wherein the spectroscopic grating is embedded in the first substrate, and the plurality of sensors are located on one of a surface of the first substrate facing the second substrate, a surface of the second substrate facing the first substrate, or a surface of the second substrate away from the first substrate.

19. The spectroscope according to claim 1, wherein the reflector is made of a metal material.

* * * * *